United States Patent
Edmaier et al.

[11] Patent Number: 5,394,854
[45] Date of Patent: Mar. 7, 1995

[54] COOLING SYSTEM FOR A SUPERCHARGED INTERNAL-COMBUSTION ENGINE

[75] Inventors: Franz Edmaier, Friedrichshafen; Günther Kiefer, Markdorf, both of Germany

[73] Assignee: MTU Motoren- Und Turbinen-Union Friedrichshafen GmbH, Friedrichshafen, Germany

[21] Appl. No.: 179,349

[22] Filed: Jan. 10, 1994

Related U.S. Application Data

[62] Division of Ser. No. 878,917, May 6, 1992, abandoned.

[30] Foreign Application Priority Data

May 6, 1991 [DE] Germany ............. 41 14 704.9

[51] Int. Cl.$^6$ ............................................... F02B 33/00
[52] U.S. Cl. ............................ 123/563; 123/542; 60/599
[58] Field of Search ............. 60/599; 123/540, 542, 123/563

[56] References Cited

U.S. PATENT DOCUMENTS

| | | | |
|---|---|---|---|
| 3,439,657 | 4/1969 | Gratzmuller | 123/563 |
| 4,317,439 | 3/1982 | Emmerling | 60/599 |
| 4,325,219 | 4/1982 | Stang et al. | 60/599 |
| 4,563,983 | 1/1986 | Hayashi et al. | 60/599 |

FOREIGN PATENT DOCUMENTS

| | | | |
|---|---|---|---|
| 0734533 | 4/1943 | Germany | 60/599 |

Primary Examiner—Richard A. Bertsch
Assistant Examiner—Charles G. Freay
Attorney, Agent, or Firm—Evenson, McKeown, Edwards & Lenahan

[57] ABSTRACT

A cooling system for a supercharged internal-combustion engine has a high-temperature and a low-temperature circulating system, in which two charge air coolers, through which coolant of different temperature levels flows, are provided for cooling the charge air in two stages. The high-temperature circulating system comprises a main branch with the internal-combustion engine and a high-temperature recooler which is connected in series with it. So that the total quantity of coolant may be kept low and a high degree of heat exchange can be achieved while the arrangement of the pipes is simple, the coolant quantity flowing out of the secondary circulating system is admixed to a coolant flow leading to the internal-combustion engine, and the total coolant flow flowing out of the internal-combustion engine is then guided to the high-temperature recooler. The coolant quantity required in the secondary branch is branched off the coolant flow flowing to the internal-combustion engine which flows away from the high-temperature recooler, and to which coolant quantities are possibly admixed that flow away from the high-temperature charge air cooler and from the low-temperature charge air cooler. The low-temperature circulating system comprises a low-temperature recooler with a series-connected low-temperature charge air cooler.

11 Claims, 3 Drawing Sheets

COOLING SYSTEM FOR A SUPERCHARGED INTERNAL-COMBUSTION ENGINE

This is a divisional of application Ser. No. 07/878,917, filed May 6, 1992, now abandoned.

BACKGROUND AND SUMMARY OF THE INVENTION

This invention relates to a cooling system for a supercharged internal-combustion engine for the two-stage cooling of the charge air compressed by an exhaust gas turbocharger.

More specifically, a cooling system is known, for example, from the German Patent Document DE-B-15 76 718, having a high-temperature circulating system which, in a main branch, comprises the internal-combustion engine and a high-temperature recooler and, in a secondary branch, comprises a high-temperature charge air cooler. The coolant required for the secondary branch is taken from the main branch and, after flowing through the high-temperature charge air cooler, is admixed to a coolant flow flowing away from the high-temperature recooler which leads to the coolant inlet of the internal-combustion engine. The system also has a low-temperature circulating system comprising a low-temperature recooler and a low-temperature charge air cooler connected in series with it, through which the charge air, which flows out of the high-temperature charge air cooler, flows for a further cooling before the charge air is fed to the cylinders of the internal-combustion engine. The system also has coolant pumps for the circulating of the coolant.

For the cooling of the charge air in two stages, according to the German Patent Document DE-B-15 76 718, two charge air coolers are used through which coolant flows that has different temperature levels. The two charge air coolers are assigned to two separate coolant circulating systems—a high-temperature circulating system and a low-temperature circulating system. The high-temperature circulating system comprises a main branch with the internal-combustion engine and a high-temperature recooler. The charge air cooler which cools the charge air in a first stage is situated in a secondary branch of the high-temperature circulating system. The coolant required in the secondary branch is taken from the coolant flow leaving the internal-combustion engine and is guided to the charge air cooler in the secondary branch. The coolant flowing out of the charge air cooler is admixed to the coolant flow leaving the high-temperature recooler which leads to the coolant inlet of the internal-combustion engine. The low-temperature circulating system comprises a low-temperature recooler and connected in series with respect to it, the charge air cooler for the cooling of the charge air in a second stage. The cooling of the engine lubricating oil takes place via a heat exchanger which is also arranged in the low-temperature circulating system. By means of the cooling system with a high-temperature circulating system and a low-temperature circulating system, an intensive cooling of the charge air is permitted in order to increase the power of the internal-combustion engine. It is a disadvantage of the indicated cooling system that the coolant quantity guided to the secondary branch is branched off from the coolant flow leaving the internal-combustion engine which has a relatively high temperature level. Because of the high temperature level of the coolant, the cooling of the charge air is correspondingly limited in the first stage. In addition, the total coolant quantity circulating in the high-temperature circulating system is large because only a portion of it flows through the high-temperature recooler.

In the British Patent Document GB-A-20 57 764, another cooling system is illustrated having a high-temperature and a low-temperature circulating system for the two-stage cooling of the charge air in two charge air coolers. The cooling system differs from the above-described cooling system only because of the fact that the coolant which flows off in the secondary branch of the high-temperature circulating system from the charge air cooler is admixed to the coolant flow leaving the internal-combustion engine which leads to the coolant inlet of the high-temperature recooler. The coolant required in the secondary branch is branched off the coolant flow leaving the high-temperature recooler. In this case, it is also disadvantageous that the required total coolant quantity is large because only a portion of the circulating coolant is used for the cooling of the internal-combustion engine. Because of the relatively low temperature level of the coolant flows mixed in front of the coolant inlet of the high-temperature recooler, the possible cooler capacity is not optimally utilized. Therefore, the overall volume of the cooler is large.

In a variant of the cooling system according to the British Patent Document GB-A-20 57 564, the coolant flow leaving the charge air cooler of the low-temperature circulating system is also admixed to the coolant flow guided to the high-temperature recooler. The coolant required in the low-temperature circulating system, like the coolant required for the secondary branch of the high-temperature circulating system, is branched off the coolant flow leaving the high-temperature recooler and is then guided via the low-temperature recooler before it enters into the low-temperature charge air cooler. In this case, only one coolant pump is required. Other disadvantages in this case are the fact that the total coolant requirement, because of the mixing of the coolant flows behind the internal-combustion engine, is relatively high and the fact that the capacity of the high-temperature recooler is not optimally utilized. Because of the series connection of the high-temperature recooler and the low-temperature recooler, a high flow resistance is obtained necessitating the use of a pump having a high power consumption. A complicated pipe arrangement is also necessary in this case.

There is therefore needed a cooling system for a supercharged internal-combustion engine which is simple with respect to the arrangement of the pipes, requires a low total quantity of coolant, and optimally utilizes the capacity of the recoolers.

These needs are met in the present invention by a cooling system for a supercharged internal-combustion engine having a high-temperature circulating system which, in a main branch, comprises the internal-combustion engine and a high-temperature recooler and, in a secondary branch, comprises a high-temperature charge air cooler. The coolant required for the secondary branch is taken from the main branch and, after flowing through the high-temperature charge air cooler, is admixed to a coolant flow flowing away from the high-temperature recooler which leads to the coolant inlet of the internal-combustion engine. The system also has a low-temperature circulating system comprising a low-temperature recooler and a low-temperature charge air cooler connected in series with it, through which the charge air, which flows out of the high-temperature charge air cooler, flows for a further cooling before the charge air is fed to the cylinders of the internal-combustion engine. The system also has coolant pumps for the circulating of the coolant. The coolant required in the secondary branch is branched off from the coolant flow leaving the high-temperature recooler. The coolant flowing through the internal-combustion engine subsequently flows to the high-temperature recooler. Alternately, the coolant required in the secondary branch is branched off a coolant flow, in which the total quantity of the coolant leaving the high-temperature recooler and the coolant flowing out of the secondary branch from the high-temperature charge air cooler are mixed. The coolant flowing through the internal-combustion engine then flows to the high-temperature recooler.

As noted above, in the present invention, the coolant quantity, which flows in the secondary branch away from the high-temperature charge air cooler, is admixed to the coolant quantity flowing in the main circulating system from the high-temperature recooler to the internal-combustion engine, and the same quantity of coolant, which flows through the high-temperature recooler, is also guided to the coolant inlet of the internal-combustion engine. Thus, the largest possible coolant quantity, in each case, participates in the heat exchange in the internal-combustion engine and in the high-temperature recooler, and the required total coolant quantity can therefore be kept low. Because of the higher temperature level of the coolant entering into the high-temperature recooler, the total degree of exchange of the high-temperature recooler will rise and is therefore optimally utilized.

The construction of the cooling system is simplified with respect to the arrangement of the pipes because, in this case, no pipe has to lead from the internal-combustion engine to the high-temperature charge air cooler in the high-temperature circulating system. However, the cooling of the charge air that is possible in the high-temperature charge air cooler is slightly reduced because of the higher coolant temperature.

In the cooling system, the coolant flows of the high-temperature and the low-temperature circulating systems are mixed. Specifically, the coolant flow which leaves the low-temperature charge air cooler (as well as the heat exchanger for engine oil and gear lubricant oil possibly connected behind it) is admixed to the mixture of the coolant flows of the high-temperature circulating system. From this mixed flow, the coolant quantity required in the secondary branch of the high-temperature circulating system as well as the coolant quantity which is guided to the coolant inlet of the low-temperature recooler is taken. It is advantageous that a more simplified arrangement of the pipes is obtained and, in addition, only one coolant pump is required. Also, the efficiency of the low-temperature recooler can be increased.

According to the present invention, it is also expedient to arrange the heat exchangers for the engine oil and the gear lubricant oil in the low-temperature circulating system. When the oil type is selected, the temperature level of the high-temperature circulating system therefore does not have to be taken into account. For a fast, load-dependent control of the coolant flow through the low-temperature charge air cooler, a control element with a bypass is provided in order to be able to achieve corresponding charge air temperatures in the case of fast load changes. The control element can be influenced by means of the control rod path, the rotational speed of the charger, the charge air pressure or the temperature of the coolant leaving the high-temperature recooler.

Other objects, advantages and novel features of the present invention will become apparent from the following detailed description of the invention when considered in conjunction with the accompanying drawings.

DETAILED DESCRIPTION OF THE DRAWINGS

Figure 1:
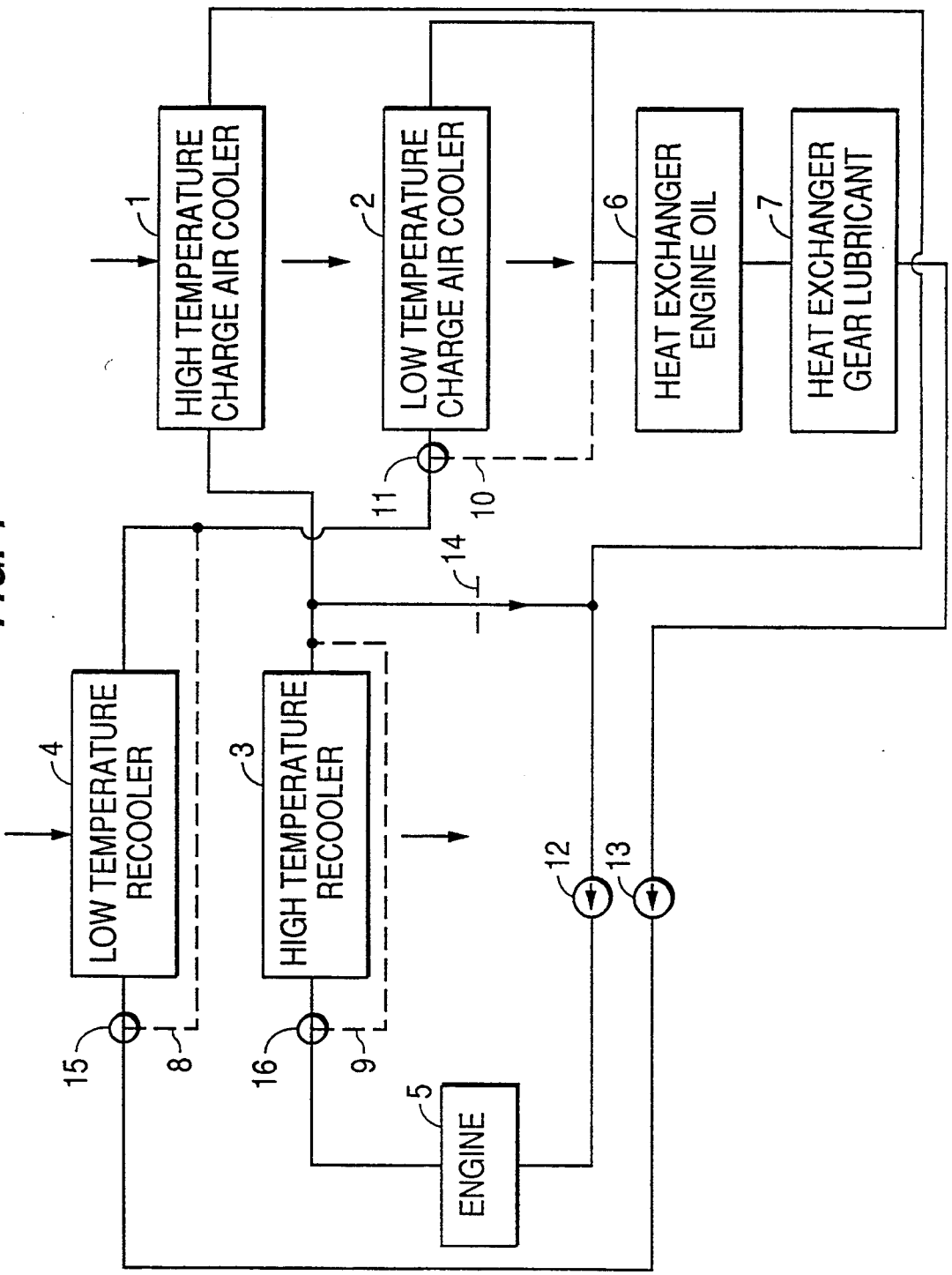
FIG. 1 is a block diagram of a cooling system according to the present invention, with a high-temperature and a low-temperature circulating system, in which case the coolant required in a secondary circulating system comprising a high-temperature charge air cooler is taken from the coolant flow emerging from the high-temperature recooler.
Figure 2:
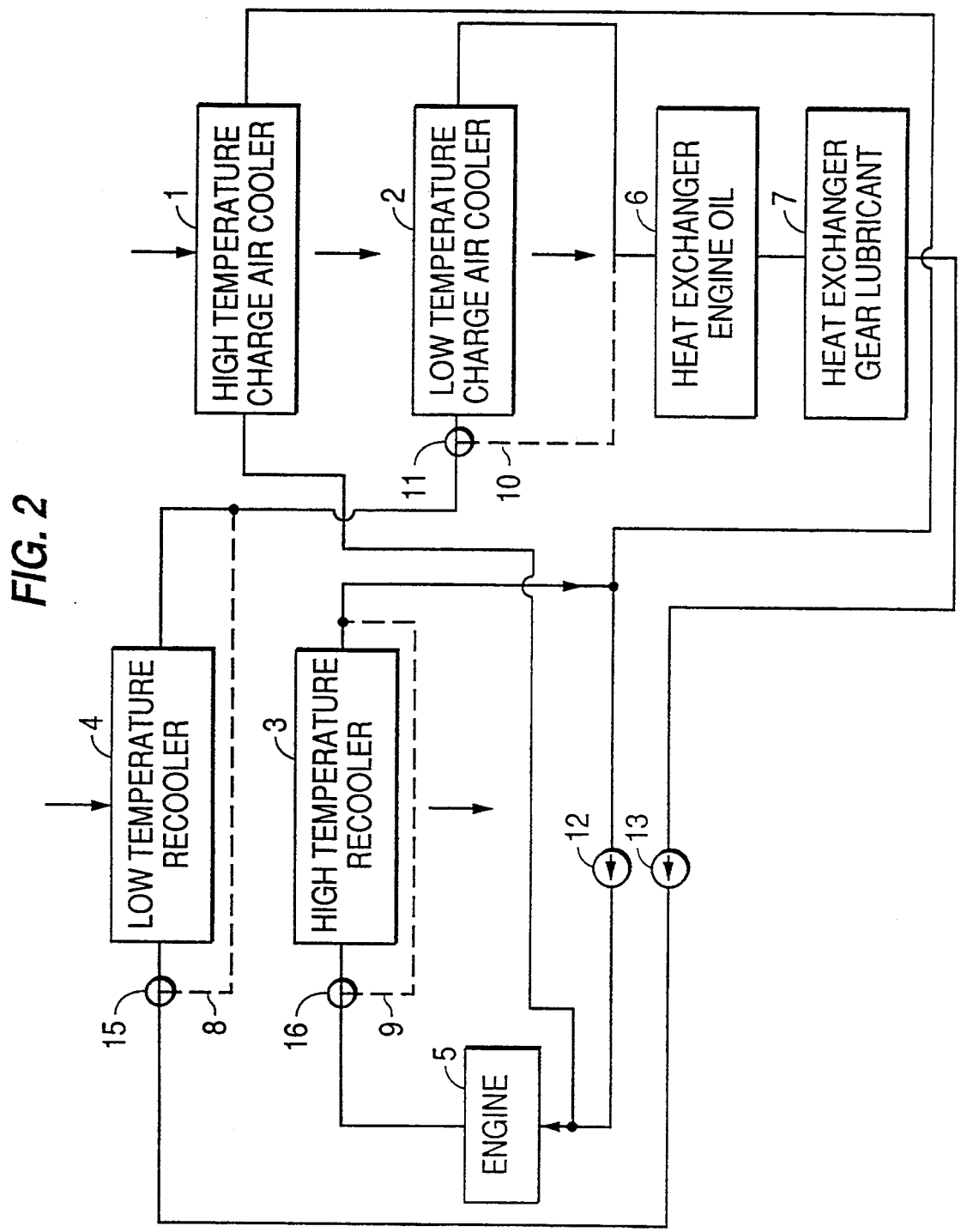
FIG. 2 is a block diagram of a cooling system according to FIG. 1, wherein the coolant required in the high-temperature charge air cooler is taken from a coolant flow in which the coolant flows leaving the high-temperature recooler and the high-temperature charge air cooler are mixed.
Figure 3:
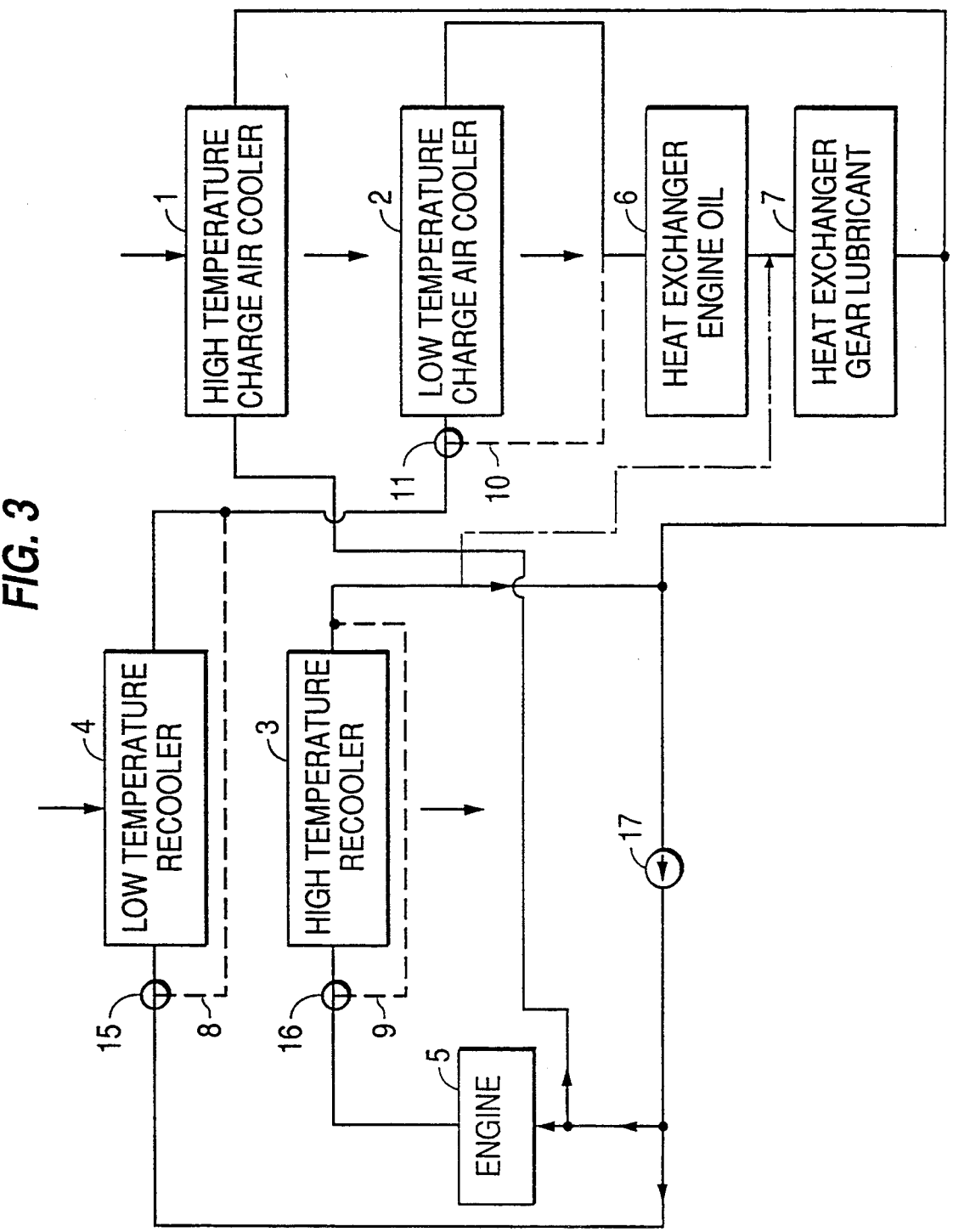
FIG. 3 is a block diagram of a cooling system according to FIG. 2, wherein the coolant flow leaving the low-temperature charge air cooler is also admixed to the mixed flow.

In the cases of the cooling circulating systems for a supercharged internal-combustion engine 5 shown in FIGS. 1, 2 and 3, the charge air compressed in an exhaust gas turbocharger is cooled in two states. For this purpose, a high-temperature charge air cooler 1 is used which is disposed in a secondary branch of a high-temperature circulating system. The secondary branch is fed with coolant from a main branch of the high-temperature circulating system in which the internal-combustion engine 5 and a high-temperature recooler 3 which is connected in series with it are situated.

The low-temperature charge air cooler 2 which is used for the cooling in a second stage is connected in series with a low-temperature recooler 4. The temperature level of the coolant flowing to the low-temperature charge air cooler 2 is lower than the temperature level of the coolant flowing to the high-temperature charge air cooler 1. Behind the low-temperature charge air cooler 2, a heat exchanger 6 for the engine oil as well as a heat exchanger 7 for the gear lubricant oil are connected. Controllable bypasses 8 and 9 with control valves 15 and 16 responding to the coolant temperature are assigned to the low-temperature recooler 4 and to the high-temperature recooler 3. For the fast, load-dependent control of the coolant flow through the low-temperature charge air cooler 2, a control element 11 is provided which controls the flow byway of the low-temperature charge air cooler 2 and a bypass 10. The control of the control element 11 as a function of the control rod path, the rotational charger speed, the charge pressure or the temperature of the coolant flowing out of the high-temperature recooler 3 permits the correspondingly fast influencing of the charge air temperatures in the case of fast load changes of the internal-combustion engine.

In the case of the cooling system according to FIG. 1, two coolant pumps 12 and 13 and a screen 14 are required. The coolant, which is required in the secondary branch of the high-temperature circulating system for the high-temperature charge air cooler 1, is branched off the coolant flow leaving the high-temperature recooler 3. The coolant flowing out of the high-temperature charge air cooler 1 is mixed with the remaining coolant leaving the high-temperature recooler 3 and is subsequently guided to the coolant inlet of the internal-combustion engine 5. The coolant leaving the internal-combustion engine 5 is fed to the high-temperature recooler 3. In the case of the shown embodiment, it is particularly advantageous for the required coolant quantity to be kept low because the total quantity of the coolant circulating in the high-temperature circulating system passes through the cooling chambers of the internal-combustion engine 5, and the total quantity of coolant leaving the internal-combustion engine 5 also arrives in front of the inlet of the high-temperature recooler 3. As a result, the highest possible degree of heat exchange is achieved, and the capacity of the high-temperature recooler 3 is optimally utilized. In addition, a simple arrangement of pipes is possible.

In the cooling system according to FIG. 2, the arrangement of the pipes is simplified even further. In this case, no pipe of the high-temperature circulating system is required from the internal-combustion engine 5 to the high-temperature charge air cooler 1. The total quantity of coolant leaving the high-temperature recooler 3 is mixed with the coolant flowing back from the high-temperature charge air cooler 1, and from this mixed flow, the coolant is taken which is required in the secondary circulating system and flows to the high-temperature charge air cooler 1. Because of the slightly higher temperature level of the coolant flowing to the high-temperature charge air cooler 1, the cooling of the charge air is slightly reduced.

Only one coolant pump 17 is required in the case of the cooling system according to FIG. 3. The coolant flows of the high-temperature and of the low-temperature circulating system are mixed. The coolant flows flowing from the low-temperature charge air cooler 2 of the low-temperature circulating system and from the high-temperature charge air cooler 1 and from the high-temperature recooler 3 are guided into a common pipe and are mixed. From this mixed flow, partial flows are branched off which arrive at the coolant inlet of the low-temperature recooler 4, at the inlet of the high-temperature charge air cooler 1, and at the coolant inlet of the internal-combustion engine 5. If required, as indicated by a dash-dotted line, the coolant quantity leaving the high-temperature recooler 3 is admixed to the flow originating from the low-temperature charge air cooler 2 in front of the inlet into the heat exchanger 7 for the gear lubricant oil, so that large amounts of heat can be dissipated which may occur, for example, in the case of a vehicle transmission with a hydraulic braking retarder. By mixing the coolant flows from the high-temperature and low-temperature circulating systems, the pipe arrangement is further simplified, while essentially retaining the advantages of the cooling circulating systems indicated in FIGS. 1 and 2.

By means of the illustrated cooling systems, a rise of the coolant temperature is permitted in one part of the cooling system by means of the uncoupling of the high-temperature and low-temperature circulating systems, and thus the effective temperature difference is increased between the cooling medium ambient air and the coolant so that finally the cooler surface and/or the cooling air requirement can be lowered. It is important in this case that, as a result of the two-stage charge air cooling, the largest portion of this heat flow in the high-temperature circulating system is dissipated which increases the efficiency of the cooling system. The cooling of the charge air in a first and second stage therefore permits a deeper cooling of the charge air in the case of comparable quality values of the components of different cooling networks. The temperature level in the high-temperature circulating system has no influence on the temperature level in the low-temperature circulating system. In the case of the arrangement of the heat exchanger for the engine oil in the low-temperature circulating system, a sufficient cooling of the engine oil is ensured also in the case of hot cooling. During a low-load operation of the internal-combustion engine, as a result of the high-temperature charge air cooler, a heating of the charge air is achieved for the improvement of the combustion sequence and the reduction of the exhaust gas emissions and of the danger of white fumes.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A cooling system using coolant for a supercharged internal-combustion engine, comprising:

a high-temperature circulating system having a main and secondary branch, said main branch including the internal-combustion engine and a high-temperature recooler, said secondary branch including a high-temperature charge-air cooler for cooling charge air wherein the coolant required for the secondary branch, is taken from the main branch and, after flowing through the high temperature charge air cooler, is admixed to a coolant flowing away from the high-temperature recooler, leading to a coolant inlet of the internal-combustion inlet;

a low-temperature circulating system comprising a low-temperature recooler and a low-temperature charge air cooler coupled in series with the low-temperature recooler, said charge-air flowing through the low-temperature charge air cooler from the high temperature charge-air cooler for a further cooling before being fed to cylinders of the internal-combustion engine;

coolant pumps for circulating the coolant;

wherein the coolant required in the secondary branch is branched off a coolant flow, in which the total quantity of the coolant leaving the high-temperature recooler and the coolant flowing out of the secondary branch from the high-temperature charge air cooler are mixed and further wherein the coolant flowing through the internal-combustion engine then flows to the high-temperature recooler; and additional heat exchangers connected downstream of the low temperature charge-air cooler, wherein the coolant circulating in the low-temperature circulating system, after leaving the low-temperature charge air cooler and the additional heat exchangers, is mixed with the coolant from the high-temperature circulating system leaving the high-temperature recooler and the high-temperature charge air cooler, and wherein the coolants guided to the low-temperature recooler and to the high-temperature charge air cooler are taken from this mixed flow.

2. A cooling system according to claim 1, wherein a first heat exchanger for the engine oil of the internal-combustion engine is connected behind the low-temperature charge air cooler in the low-temperature circulating system.

3. A cooling system according to claim 2, wherein a second heat exchanger for the gear lubricant oil of the internal-combustion engine is connected behind the low-temperature charge air cooler in the low-temperature circulating system.

4. A cooling system according to claim 3, wherein the coolant leaving the high-temperature recooler is admixed to the coolant flow of the low-temperature circulating system in front of the inlet into the second heat exchanger for the gear lubricant oil of the internal-combustion engine.

5. A cooling system according to claim 1, wherein a second heat exchanger for the gear lubricant oil of the internal-combustion engine is connected behind the low-temperature charge air cooler in the low-temperature circulating system.

6. A cooling system according to claim 5, wherein the coolant leaving the high-temperature recooler is admixed to the coolant flow of the low-temperature circulating system in front of the inlet into the second heat exchanger for the gear lubricant oil of the internal-combustion engine.

7. A cooling system using coolant for a supercharged internal-combustion engine, comprising:
- a high-temperature circulating system having a main and secondary branch, said main branch including the internal-combustion engine and a high-temperature recooler, said secondary branch including a high-temperature charge-air cooler for cooling charge air wherein the coolant required for the secondary branch, is taken from the main branch and, after flowing through the high temperature charge air cooler, is admixed to a coolant flowing away from the high-temperature recooler, leading to a coolant inlet of the internal-combustion inlet;
- a low-temperature circulating system comprising a low-temperature recooler and a low-temperature charge air cooler coupled in series with the low-temperature recooler, said charge-air flowing through the low-temperature charge air cooler from the high temperature charge-air cooler for a further cooling before being fed to cylinders of the internal-combustion engine;
- coolant pumps for circulating the coolant;
- wherein the coolant required in the secondary branch is branched off a coolant flow, in which the total quantity of the coolant leaving the high-temperature recooler and the coolant flowing out of the secondary branch from the high-temperature charge air cooler are mixed and further wherein the coolant flowing through the internal-combustion engine then flows to the high-temperature recooler; and
- a control element with a bypass assigned to the low-temperature charge air cooler, said control element being controlled as a function of operating conditions of the internal-combustion engine.

8. A cooling system according to claim 7, wherein the control element is controlled as a function of the control rod position which represents a measurement for the respective injected amount of fuel.

9. A cooling system according to claim 7, wherein the control of the control element takes place as a function of the rotational charger speed.

10. A cooling system according to claim 7, wherein the control of the control element takes place as a function of the charge-air pressure.

11. A cooling system according to claim 7, wherein the control of the control element takes place as a function of the temperature of the coolant coming from the high-temperature recooler.

* * * * *